United States Patent
Abusamra

[11] Patent Number: 5,775,815
[45] Date of Patent: Jul. 7, 1998

[54] BALL AND SOCKET SWIVEL BEARING

[75] Inventor: Muneer Abusamra, Spencerville, Ind.

[73] Assignee: Tuthill Corporation, New Haven, Ind.

[21] Appl. No.: 806,843

[22] Filed: Feb. 26, 1997

[51] Int. Cl.$^6$ ............................................. F16C 23/04
[52] U.S. Cl. ................................... 384/208; 384/906
[58] Field of Search ................................. 384/206, 208, 384/209, 210, 213, 214, 906

[56] References Cited

U.S. PATENT DOCUMENTS

| Re. 27,778 | 10/1973 | Potter et al. |
| 1,636,903 | 7/1927 | Dodge |
| 1,912,780 | 6/1933 | Lautz |
| 2,355,232 | 8/1944 | Nelson et al. |
| 2,366,668 | 1/1945 | Heim |
| 2,400,506 | 5/1946 | Heim |
| 2,675,279 | 4/1954 | Heim |
| 2,853,346 | 9/1958 | Spangenberg |
| 2,995,953 | 8/1961 | De Fazi |
| 3,287,071 | 11/1966 | Tucker |
| 3,629,921 | 12/1971 | Davies et al. |
| 3,746,408 | 7/1973 | Wachter et al. |
| 3,947,077 | 3/1976 | Berg et al. |
| 4,053,665 | 10/1977 | Orkin et al. |
| 4,108,505 | 8/1978 | Orkin |
| 4,523,861 | 6/1985 | Stella |
| 4,678,350 | 7/1987 | Statz |
| 4,846,590 | 7/1989 | Teramachi |
| 5,073,038 | 12/1991 | O'Connell |
| 5,405,200 | 4/1995 | Sumiyoshi et al. |
| 5,480,231 | 1/1996 | Sasaki et al. |

Primary Examiner—Lenard A. Footland
Attorney, Agent, or Firm—Pearne, Gordon, McCoy and Granger LLP

[57] ABSTRACT

A ball and socket swivel bearing is disclosed. The bearing comprises a rod end having a shank portion and a metallic socket portion. The socket portion has a continuous toroidal inner periphery and has outer walls defining circular side openings. A metallic swivel ball is mounted within the socket portion and is surrounded with a plastic bearing material. A key slot is provided in the shank portion and communicates with the space between the ball and the socket to act as a sprue for the introduction of plastic bearing material and to provide resistance to breakaway torque applied to the bearing material.

8 Claims, 1 Drawing Sheet

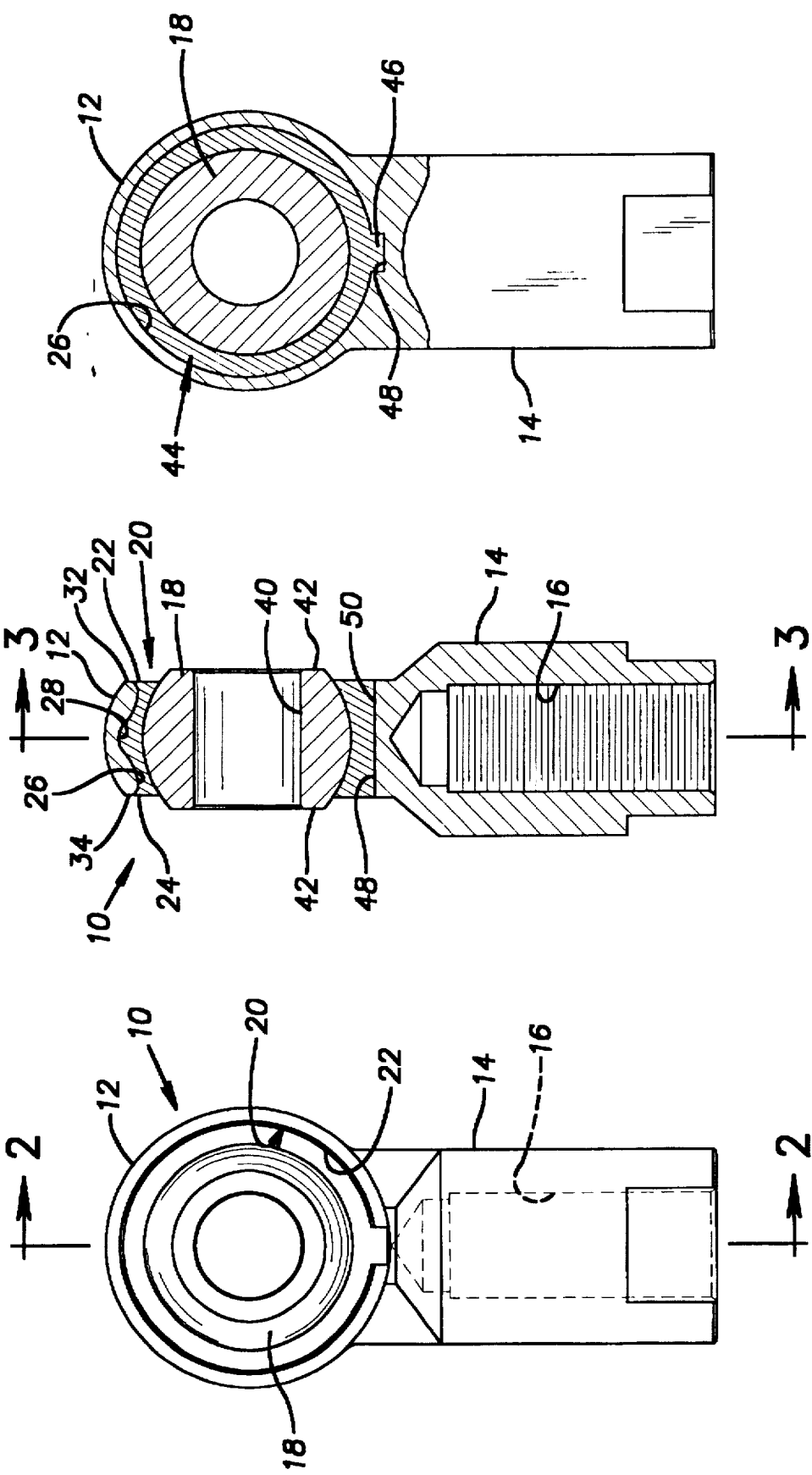

BALL AND SOCKET SWIVEL BEARING

BACKGROUND OF THE INVENTION

This invention relates generally to ball and socket swivel bearings, and more particullary to a novel and improved swivel bearing of the type having a molded bearing material forming a spherical socket for a metal swivel ball member.

U.S. Pat. No. 3,629,921, describes and claims a ball and socket swivel bearing in which a non-metallic bearing material is molded within an outer metal socket member and around an inner metal swivel ball member. The swivel member is formed with an external surface which is a portion of a sphere, and which mates with the interior surface of the non-metallic bearing material. With this structure, the swivel member and outer metal socket member can swivel relative to each other in all directions.

In the aforementioned patent, the molding process is performed while the inner swivel member is reciprocated laterally to produce a controlled amount of clearance between the non-metallic bearing material and the spherical surface of the swivel member. In order to perform the molding operation, a rod end having a housing is provided. The housing has an enlarged annular flat head and a laterally extending shank provided with a threaded bore. A swivel member having a ball shaped bearing member is positioned within an opening in the head. The opening is part spherical generally conforming to the curvature of the ball and provided with an annular coaxial groove or recess. End portions of the opening which extend from the part spherical curvatures are cylindrical shaped and of equal diameter. The rod end and the swivel member are mounted in a mold so that the ball is spaced from the spherical opening to define a chamber into which a plastic bearing material is injected. The plastic is injected through diametrically opposite openings in the head of the rod end. In the finished rod end the raceway formed by the bearing material is prevented from being rotated or otherwise accidentally removed from the housing by virtue of an annular rib formed by the grove in the spherical surface and also by trunnion-like shafts formed by the filling of passages with the bearing material.

While the plastic trunnion assist in retaining the plastic within the housing, the diametrical openings in the head constitute areas of weakness in use by providing areas of stress concentrations in the metallic head.

Other prior art arrangements which provide access to the raceway through the side wall of the head are illustrated by U.S. Pat. Nos. 4,108,505 and 3,287,071. A further technique for injecting moldable material into the raceway chamber of a bearing assembly may be found in U.S. Pat. No. 3,746,408. In the '408 Patent there is illustrated a stamped bearing assembly wherein the housing of the bearing assembly is provided with a channel connecting the ball pocket with a bore in the shank. The channel is stamped into the housing halves and itself provides a raised rib on opposite sides of the housing to add strength to the housing sections. In a machined metal housing, however, the provisions of a channel from the shank to the ball pocket would diminish the strength of the shank.

SUMMARY OF THE INVENTION

In accordance with the present invention a non-metallic bearing material is molded within an outer metal socket member and around a metallic inner ball member having a spherical bearing surface mating with the non-metallic bearing material. The non-metallic bearing material is injected into the space between the inner ball member and the outer metal socket through a keyhole passage provided at the juncture area between the outer metal socket and the rod portion of the bearing. The bearing material in the keyhole passage acts to resist breakaway torque between the bearing material and the outer metal socket member and the keyhole eliminates the need to provide passageways through the wall of the outer member socket which tend to provide areas of stress concentration leading to mechanical failure of the outer metal socket member.

This invention provides a ball and socket swivel bearing comprising a rod end having a shank portion and a metallic socket portion. The socket portion has a continuous toroidal inner periphery and has outer walls defining circular side openings. A metallic swivel ball member having an exterior spherical surface is positioned within the socket so that the bearing surface is spaced from the toroidal inner periphery of the socket to thereby define a cavity. A bearing material is molded in the cavity to provide an interior spherical bearing surface. The continuous toroidal inner periphery of the socket is concave and has a minor diameter defined by the side openings and further has a major diameter midway between the side openings. A key slot is provided in the shank portion of the rod end and extends through at least one of the side walls and communicates with the toroidal inner periphery of the socket portion so that the bearing material molded in the key slot enhances the breakaway resistance between the molded material and the toroidal inner periphery of the metallic socket.

The foregoing arrangement eliminates the side openings in the outer member socket which are disclosed in the '921 patent and provide a mechanical key lock between the plastic bearing material and the raceway which is at least as effective as the trunnion arrangement shown in the '921 patent.

BRIEF DESCRIPTION OF THE DRAWINGS

FIG. 1 is an elevational view of a ball and socket swivel bearing according to this invention;

FIG. 2 is a cross-sectional view, the plane of the section being indicated by the line 2—2 in FIG. 1; and FIG. 3 is a cross-sectional view, the plane of the section being indicated by the line 3—3 in FIG. 2.

DETAILED DESCRIPTION OF THE INVENTION

Referring now to the drawings there is illustrated a ball and socket bearing 10 which is in the form of a rod end having an enlarged, annular socket head 12 and a laterally extending shank 14 provided with a threaded bore 16. A metallic swivel ball member 18 is positioned within an opening 20 in the head 12. The opening 20 is defined by side openings 22 and 24 in the head which define minor diameters for a continuous toroidal inner periphery 26. The toroidal inner periphery 26 is further defined by an annular recess or groove 28 which defines a major diameter midway between the side openings 22 and 24.

The ball 18 is of conventional design and has a coaxial bore 40 adapted to receive a mounting stud or the like (not shown) and furthermore has flat parallel surfaces defining opposite sides 42 which, when the ball 18 is centered in the head as shown in the drawings, lie in the parallel planes positioned outwardly from and parallel to the head surfaces 32 and 34.

The ball 18 conforms generally to the toroidal surface 26 and has a major diameter which is adapted to clear the openings 22 and 24 during assembly. The space between the head 12 and the ball 18 is occupied by a raceway 44 of plastic bearing material secured in the head 12 by means of the annular groove 28 and a key shaped appendage 46 which fills a key slot 48 cut into the shank portion. The key slot 48 extends through the outer walls which define the side openings 22 and 24 so that the bottom wall 50 of the key slot 48 intersects the major diameter of the inner periphery of the socket.

The raceway 44 may be formed from fiber reinforced nylon which is injected into the space 20 and accordance with the teachings U.S. Pat. No. 3,629,921, the subject matter of which is incorporated herein by reference.

In the finished rod end the ball 18 swivels freely and is securely mounted in the raceway. The raceway 44 is prevented from being rotated or otherwise accidentally removed from the head 12 by virtue of the annular rib formed by the groove 28 and also the key slot 48.

What is claimed is:

1. A ball and socket swivel bearing comprising a rod and having a shank portion and a metallic socket portion, said socket portion having a continuous toroidal inner periphery and having outer side walls defining circular side openings, a metallic swivel ball member having an exterior spherical bearing surface positioned within said socket, said bearing surface being spaced from said inner periphery to thereby define a cavity, a bearing material molded in said cavity providing an interior spherical bearing surface for said ball member, said continuous toroidal inner periphery being concave and having a minor diameter defined by said side openings and further having a major diameter midway between said side openings, a key slot in said shank portion extending through at least one of said outer side walls and communicating with said toroidal inner periphery of said socket portion, said bearing material being molded in said key slot to enhance breakaway resistance between said molded material and said toroidal inner periphery.

2. A ball and socket swivel bearing according to claim 1 wherein said key slot extends through both said outer side walls.

3. A ball and socket swivel bearing according to claim 2 wherein said key slot has a bottom wall which intercepts said major diameter.

4. A ball and socket swivel bearing according to claim 3 wherein said toroidal inner periphery is provided with an annular groove midway between said side openings.

5. A ball and socket swivel bearing according to claim 4, wherein said annular groove defines said major diameter.

6. A ball and socket swivel bearing according to claim 1 wherein said key slot has a bottom wall which intercepts said major diameter.

7. A ball and socket swivel bearing according to claim 6 wherein said toroidal inner periphery is provided with an annular groove midway between said side openings.

8. A ball and socket swivel bearing according to claim 7, wherein said annular groove defines said major diameter.

* * * * *